(12) United States Patent
Ogawa et al.

(10) Patent No.: US 12,033,809 B2
(45) Date of Patent: Jul. 9, 2024

(54) CONDUCTIVE MATERIAL, CONDUCTIVE FILM, ELECTROCHEMICAL CAPACITOR, CONDUCTIVE MATERIAL PRODUCTION METHOD, AND CONDUCTIVE FILM PRODUCTION METHOD

(71) Applicant: Murata Manufacturing Co., Ltd., Nagaokakyo (JP)

(72) Inventors: Yuusuke Ogawa, Nagaokakyo (JP); Masashi Koyanagi, Nagaokakyo (JP); Yuta Kiguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 76 days.

(21) Appl. No.: 17/589,251

(22) Filed: Jan. 31, 2022

(65) Prior Publication Data

US 2022/0157534 A1    May 19, 2022

Related U.S. Application Data

(63) Continuation of application No. PCT/JP2020/029854, filed on Aug. 4, 2020.

(30) Foreign Application Priority Data

Aug. 5, 2019 (JP) .................. 2019-143751

(51) Int. Cl.
*H01B 1/00* (2006.01)
*B05D 5/12* (2006.01)
(Continued)

(52) U.S. Cl.
CPC ............ *H01G 9/048* (2013.01); *B05D 5/12* (2013.01); *H01B 1/00* (2013.01); *H01G 9/145* (2013.01); *H01G 11/00* (2013.01)

(58) Field of Classification Search
CPC ............ H01B 1/00; H01B 1/06; H01G 11/02; H01G 11/30; B05D 5/12
See application file for complete search history.

(56) References Cited

U.S. PATENT DOCUMENTS

| | | | |
|---|---|---|---|
| 4,940,523 A | 7/1990 | Takeshima | |
| 10,947,161 B2 * | 3/2021 | Sato | ................ H01M 10/0525 |
| 2017/0294546 A1 | 10/2017 | Ghidiu et al. | |
| 2018/0338396 A1 | 11/2018 | Torita et al. | |

(Continued)

FOREIGN PATENT DOCUMENTS

| | | |
|---|---|---|
| CN | 106622318 A | 5/2017 |
| CN | 107001051 A | 8/2017 |

(Continued)

OTHER PUBLICATIONS

Kong et al "Further surface modification by carbon coating for in-situ growth of Fe3O4 nanoparticles on MXene Ti3C2 multilayers for advanced Li-ion storage", Electrochimica Acta 289 (2018) 228-237.*

(Continued)

*Primary Examiner* — Mark Kopec
(74) *Attorney, Agent, or Firm* — Arentfox Schiff LLP

(57) ABSTRACT

A conductive material including a plurality of particles, the plurality of particles including at least a first particle having: a layered material including one or plural layers, wherein the one or plural layers include a layer body represented by $M_mX_n$ (where M is at least one metal of Group 3, 4, 5, 6, or 7, X is a carbon atom, a nitrogen atom, or a combination thereof, n is not less than 1 and not more than 4, and m is more than n but not more than 5), and a modifier or terminal T (where T is at least one selected from the group consisting of a hydroxyl group, a fluorine atom, a chlorine atom, an oxygen atom, and a hydrogen atom) existing on a surface of the layer body; and a metal material at least partially covering the layered material.

24 Claims, 6 Drawing Sheets

(51) Int. Cl.
   *H01G 9/048*   (2006.01)
   *H01G 9/145*   (2006.01)
   *H01G 11/00*   (2013.01)

(56) References Cited

U.S. PATENT DOCUMENTS

2019/0166733 A1   5/2019   Gogotsi et al.
2022/0367853 A1* 11/2022   Nicolosi .............. H01M 4/364

FOREIGN PATENT DOCUMENTS

| CN | 107146650 A | | 9/2017 |
| CN | 108385090 | * | 8/2018 |
| CN | 109417863 A | | 3/2019 |
| JP | H02-153068 A | | 6/1990 |
| JP | 2016063171 A | | 4/2016 |
| JP | 2017076739 A | | 4/2017 |
| WO | 2018066549 A1 | | 4/2018 |
| WO | 2018212044 A1 | | 11/2018 |

OTHER PUBLICATIONS

Qian et al "Fabrication of urchin-like ZnO-MXene nanocomposites for highperformance electromagnetic absorption", Ceramics International 43 (2017) 10757-10762.*
Zhang et al "Cu2O Hybridized Titanium Carbide with Open Conductive Frameworks for Lithium-ion Batteries", Electrochimica Acta 202 (2016) 24-31.*
Yoon et al "Low-dimensional carbon and MXene-based electrochemical capacitor electrodes", Nanotechnology 27 (2016) 172001 (21pp).*
Written Opinion of the International Searching Authority issued for PCT/JP2020/029854, dated Oct. 20, 2020.
Emre Kayali et al.;"Controlling the Dimensions of 2D MXenes for Ultra-high-rate Pseudocapacitive Energy Storage"; ACS Applied Materials & Interfaces, 2018, vol. 10, Issue 31, pp. 25949-25954 (19 pages).
International Search Report issued for PCT/JP2020/029854, dated Oct. 20, 2020.

* cited by examiner

CONDUCTIVE MATERIAL, CONDUCTIVE FILM, ELECTROCHEMICAL CAPACITOR, CONDUCTIVE MATERIAL PRODUCTION METHOD, AND CONDUCTIVE FILM PRODUCTION METHOD

CROSS REFERENCE TO RELATED APPLICATIONS

The present application is a continuation of International application No. PCT/JP2020/029854, filed Aug. 4, 2020, which claims priority to Japanese Patent Application No. 2019-143751, filed Aug. 5, 2019, the entire contents of each of which are incorporated herein by reference.

FIELD OF THE INVENTION

The present invention relates to a conductive material, a conductive film, an electrochemical capacitor using a conductive material or a conductive film, a method for producing a conductive material, and a method for producing a conductive film.

BACKGROUND OF THE INVENTION

In recent years, MXene has been attracting attention as a new material having conductivity. MXene is a type of so-called two-dimensional material, and as will be described later, is a material in the form of one or a plurality of layers.

It is known that MXene can be used as an electrode active material of an electrochemical capacitor (particularly, a pseudo capacitor), for example, as disclosed in Non Patent Literature 1. The electrochemical capacitor is a capacitor using capacitance developed due to a physicochemical reaction between an electrode (electrode active material) and ions (electrolyte ions) in an electrolytic solution, and can be used as a device (power storage device) that stores electric energy. Among electrochemical capacitors, those in which a metal oxide, a layered material (or an intercalation compound), or the like is used for an electrode active material, and a reaction (for example, a change in the oxidation number of metal elements constituting the electrode active material) accompanied by exchange of electrons occurs between an electrode and ions in an electrolytic solution, and thereby capacitors that develop a capacitance (pseudo capacitance) are called "pseudo capacitors", "redox capacitors", or the like.

In addition, in various other applications, a conductive material in which MXene is combined with a metal material has been proposed. For example, Patent Literature 1 discloses an Ag-MXene contact material, which is produced by mixing a MXene powder (particle size: 1 to 100 μm) with a silver (Ag) powder (particle size: 1 to 100 μm) to form a green body, and firing the green body so that a co-sintered body in which MXene and Ag are mixed with each other is obtained. In addition, for example, Patent Literature 2 discloses a stacked composite photocatalyst in which bimetal (any two selected from the group consisting of Pd, Au, and Ag) nanoparticles are hetero-bonded, and this is produced by preparing bimetal nanoparticles in a liquid phase, adding an adhesive and MXene thereto, appropriately treating the mixture, and then removing an unnecessary liquid phase, and the bimetal nanoparticles are dispersed in MXene (photocatalytic active component) by an adhesive.

Patent Literature 1: CN 107146650 A
Patent Literature 2: CN 106622318 A

Non Patent Literature 1: Emre Kayali et al., "Controlling the Dimensions of 2D MXenes for Ultrahigh-Rate Pseudocapacitive Energy Storage", ACS Applied Materials & Interfaces, 2018, Volume 10, Issue 31, pp. 25949-25954

SUMMARY OF THE INVENTION

MXene has an extremely high carrier density (carrier concentration) and has high conductivity in the in-plane direction. Since MXene contains a metal atom M, the conductivity of MXene in the thickness direction is higher than that of, for example, graphene, but is lower than that of MXene in the in-plane direction. Therefore, in a case where MXene is used alone (without being combined with a metal material) as in Non Patent Literature 1, there is a problem that the conductivity in the thickness direction is low. In a case of a co-sintered body in which MXene and Ag are mixed with each other as in Patent Literature 1, substantially the entire surface of MXene is covered with Ag except for the surface of the co-sintered body, in other words, MXene is not exposed. Such a co-sintered body cannot effectively utilize a modifier or terminal T present on the surface of MXene, and is not preferable, for example, as a material of an electrode of an electrochemical capacitor because the pseudo capacitance is lowered. In addition, when the bimetal nanoparticles (metal particles) are dispersed in MXene and hetero-bonded as in Patent Literature 2, the metal particles are substantially in point contact with MXene, and thus the effect of improving the conductivity of MXene in the thickness direction is limited.

An object of the present invention is to provide a conductive material containing MXene and a metal material, in which the conductivity in the thickness direction of MXene is improved while the effect of modifier or terminal T existing on the surface of MXene can be exhibited. Further, an object of the present invention is to provide a conductive film using such a conductive material, an electrochemical capacitor using a conductive material or a conductive film, a method for producing a conductive material, and a method for producing a conductive film.

According to one aspect of the present invention, there is provided a conductive material comprising:
  a plurality of particles, the plurality of particles including at least a first particle comprising:
    a layered material including one or plural layers, wherein the one or plural layers including a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and
      a modifier or terminal T existing on a surface of the layer body, wherein T is at least one selected from the group consisting of a hydroxyl group, a fluorine atom, a chlorine atom, an oxygen atom, and a hydrogen atom; and
    a metal material at least partially covering the layered material.

According to another aspect of the present invention, there is provided a conductive film which is a film body comprising the conductive material.

According to still another aspect of the present invention, there is provided an electrochemical capacitor comprising an electrolytic solution; and two electrodes spaced apart from each other in the electrolytic solution, wherein at least one of the two electrodes comprises the conductive material or the conductive film.

According to still another aspect of the present invention, there is provided a method for producing a conductive material, the method comprising:

(a) covering one or more particles of a layered material having one or plural layers with a metal material to obtain one or more precursor particles, the one or plural layers including a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and (b) pulverizing the one or more precursor particles to obtain a plurality of particles containing at least a first particle with the metal material at least partially covering the layered material.

According to still another aspect of the present invention, there is provided a method for producing a conductive film, the method comprising: forming the plurality of particles obtained by the method for producing a conductive material into a film form.

According to the conductive material of the present invention, the conductive material contains the predetermined layered material (also referred to as "MXene" in the present specification) and the metal material in which MXene and a metal material are composited so that the metal material partially covers the layered material, and thus the conductivity of MXene in the thickness direction can be improved while the effect of the modifier or terminal T present on the surface of MXene can be exhibited. That is, according to the present invention, there is provided a conductive material containing MXene and a metal material, in which the conductivity of MXene in the thickness direction is improved while the effect of the modifier or terminal T existing on the surface of MXene can be exhibited. Furthermore, according to the present invention, there is provided a conductive film using such a conductive material, an electrochemical capacitor using a conductive material or a conductive film, a method for producing a conductive material, and a method for producing a conductive film.

BRIEF DESCRIPTION OF THE DRAWINGS

FIG. 1(a) illustrates a first particle in which a part of a layered material is covered with a metal material and the rest is exposed, and FIG. 1(b) illustrates a second particle in which the entire layered material is covered with the metal material and a third particle in which the entire layered material is exposed.

FIG. 2(a) is a schematic cross-sectional view illustrating a particle of MXene as a layered material, FIG. 2(b) is a schematic cross-sectional view illustrating a precursor particle obtained by covering the particle of MXene illustrated in FIG. 2(a) with a metal material, and FIG. 2(c) illustrates a state in which the precursor particle in FIG. 2(b) is pulverized.

DETAILED DESCRIPTION OF THE PREFERRED EMBODIMENTS

Figure 1A:
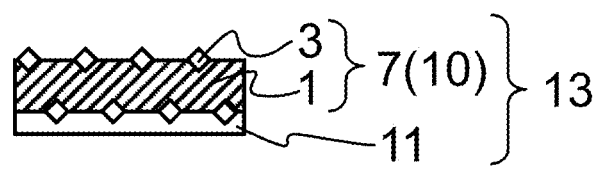
FIGS. 1(a) and 1(b) are schematic cross-sectional views illustrating particles contained in a conductive material in one embodiment of the present invention.

Embodiments of the present invention will be described in detail below, but the present invention is not limited to these embodiments.

Embodiment 1

The present embodiment relates to a conductive material and a method for producing the same, and further relates to a conductive film and a method for producing the same.

The conductive material of the present embodiment is a conductive material that includes a plurality of particles, the plurality of particles including at least a first particle comprising a predetermined layered material and a metal material, and the metal material partially covers the layered material. In the present invention, the metal material "covers" the layered material, which does not include a state in which the metal material is "next to" to the layered material, but representatively means a state in which the metal material is bonded to the layered material.

The predetermined layered material that can be used in this embodiment is MXene and is defined as:

A layered material containing one or plural layers, the one or plural layers including a layer body (the layer body may have a crystal lattice in which each X is located in an octahedral array of M) represented by a formula below:

$M_mX_n$ (wherein M is at least one metal of Group 3, 4, 5, 6, or 7 and may contain at least one selected from the group consisting of so-called early transition metals such as Sc, Ti, Zr, Hf, V, Nb, Ta, Cr, Mo, and Mn, X is a carbon atom, a nitrogen atom, or a combination thereof, n is not less than 1 and not more than 4, and m is more than n but not more than 5) and a modifier or terminal T (T is at least one selected from the group consisting of a hydroxyl group, a fluorine atom, a chlorine atom, an oxygen atom, and a hydrogen atom) present on the surface (more specifically, at least one of the two opposing surfaces of the layered body) of the layered body. (This can be understood as a layered compound, also represented as "$M_mX_nT_s$", where s is any number and traditionally x is sometimes used instead of s.) Typically, n may be, but is not limited to, 1, 2, 3, or 4.

The conductive material of the present embodiment can be understood as a composite material containing MXene and a metal material (composite of MXene and a metal material). In the conductive material of the present embodiment, the metal material partially covers MXene, and thus surface contact can be obtained by covering with the metal material while a non-covered portion of MXene is present, so that a higher conductivity can be brought about (as compared with point contact by metal particles as in, for example, Patent Literature 2 or Comparative Example 2 described later). As a result, the conductivity of MXene in the thickness direction can be improved while the effect of the modifier or terminal T existing on the surface of MXene can be exhibited.

In the above formula of MXene, M is preferably at least one selected from the group consisting of Ti, Zr, Hf, V, Nb, Ta, Cr, and Mo.

The metal material preferably has higher conductivity than MXene. The conductivity of MXene can be determined by the resistance of the grain boundaries of the film. The metal material having higher conductivity than MXene may be preferably one (a simple substance) or any two or more alloys or composites selected from the group consisting of Fe, Cr, Pb, Ti, Pt, Li, K, Al, Cu, Au, Mg, Mo, Ni, Ag, W, Co, and Zn, and more preferably one (a simple substance) or any two or more alloys or composites selected from the group consisting of Ti, Li, K, Al, Cu, Au, Mg, Mo, Ni, Ag, W, Co, and Zn. The electric resistivity of a simple substance is $1.59 \times 10^{-8}$ Ω·cm for Ag, $1.68 \times 10^{-8}$ Ω·cm for Cu, $6.99 \times 10^{-8}$ Ω·m for Ni, and $4.20 \times 10^{-7}$ Ω·cm for Ti.

In the present embodiment, the plurality of particles may be understood as a particulate material, a group of particles or a collection of particles.

For example, the plurality of particles may include a first particle(s) in which a part of MXene is covered with a metal material and the rest is exposed. As illustrated in FIG. 1(a), in a first particle 13, MXene 10 may include a MXene layer 7 having a modifier or terminal T3 on a surface of a $M_mX_n$ layer 1, a part of the MXene 10 is covered with a metal material 11, and the rest of the MXene 10 is exposed. As a result, it is possible to improve the conductivity of MXene in the thickness direction by the presence of the metal material 11 (as compared with a case where the metal material 11 is not present) while the effect of the modifier or terminal T can be exhibited by exposing the modifier or terminal T3 located on the surface of the rest of the MXene 10. Note that FIG. 1(a) exemplarily illustrates a case where the MXene 10 includes one MXene layer 7, but the MXene 10 may include one or more MXene layers, and in a case where the MXene includes a plurality of MXene layers, the MXene layers may be connected by the metal material 11 (for example, at least at one end), or may be stacked by any other appropriate aspect (for example, van der Waals force or the like). Furthermore, as exemplified in FIG. 1(a), in the first particle 13, it is preferable that one of two mutually opposed planes of MXene 10 (which may include one or more MXene layers 7) is covered with the metal material 11, and the other is exposed. As a result, the covering of the metal material 11 extends planarly (preferably uniformly) on the above plane, and a higher conductivity can be obtained.

Figure 1B:
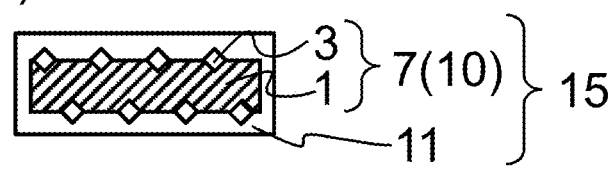
Figure 1B:
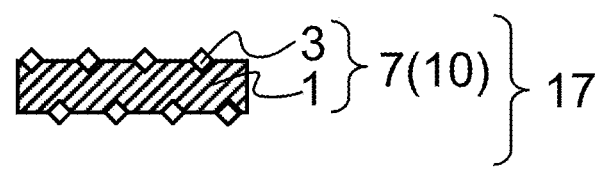

Further, for example, as exemplified in FIG. 1(b), the plurality of particles may include a second particle(s) 15 in which the entirety of MXene 10 (which may include one or a plurality of MXene layers 7) is covered with a metal material, and a third particle(s) 17 in which the entirety of MXene 10 (which may include one or a plurality of MXene layers 7) is exposed. For example, the plurality of particles may include the first particle(s) 13, the second particle(s) 15, and the third particle(s) 17. In addition, for example, the plurality of particles may include the first particle(s) 13 and the third particle(s) 17 and may be substantially free of the second particle(s) 15.

The proportion of the metal material in the plurality of particles can be appropriately selected according to the application of the conductive material of the present embodiment. For example, when the conductive material is used for an electrode (more specifically, as the electrode active material) of an electrochemical capacitor as described later in Embodiment 2, a proportion of the metal material in the plurality of particles may be 1% to 30% by mass.

The conductive material of the present embodiment may have, for example, a film-like form. In other words, there is provided a conductive film which is a film-like formed body comprising the conductive material. In this case, the conductivity of the film in the thickness direction can be improved. Although the present embodiment is not limited, depending on the method for forming a film, in a majority of the plurality of particles, for example, 60% or more, preferably 75% or more, and particularly 90% or more, the plane of MXene tends to be aligned with the plane of the film, and in a minority of the plurality of particles, for example, 40% or less, preferably 25% or less, and particularly 10% or less, the plane of MXene may be inclined with respect to the plane of the film.

The conductive material of the present embodiment can be obtained by, for example, a manufacturing method including
(a) covering one or more particles formed of MXene with a metal material to obtain one or more precursor particles; and
(b) pulverizing the one or more precursor particles to obtain at least a first particle with the metal material at least partially covering the layered material.

Further, the conductive film of the present embodiment can be obtained by a manufacturing method including forming the plurality of particles obtained by the method for producing a conductive material into a film-like form.

MXene can be obtained by selectively etching (removing and optionally layer-separating) A atoms (and optionally a part of M atoms) from a MAX phase. The MAX phase is represented by the following formula:

$M_mAX_n$ 

(wherein M, X, n, and m are as described above, and A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, and Cd, and is preferably Al), and has a crystal structure in which a layer formed of A atoms is located between two layers represented by $M_mX_n$ (each X may have a crystal lattice located within an octahedral array of M). Typically, in the case of m=n+1, the MAX phase has a repeating unit in which one layer of X atoms is disposed between adjacent layers n+1 layers of M atoms (these layers are also collectively referred to as "$M_mX_n$ layer"), and a layer of A atoms ("A atom layer") is disposed as a next layer of the (n+1)th layer of M atoms; however, the present invention is not limited thereto. By selectively etching (removing and optionally layer-separating) the A atoms (and optionally a part of the M atoms) from the MAX phase, the A atom layer (and optionally a part of the M atoms) is removed, and a hydroxyl group, a fluorine atom, a chlorine atom, an oxygen atom, a hydrogen atom, and the like existing in an etching liquid (usually, but not limited to, an aqueous solution of a fluorine-containing acid is used) are modified on the exposed surface of the $M_mX_n$ layer, thereby terminating the surface. The etching can be performed using an etching solution containing F$^-$, and for example, a method using a mixed solution of lithium fluoride and hydrochloric acid, a method using hydrofluoric acid, or the like may be used. Thereafter, the layer separation (delamination, separating multilayer MXene into single-layer MXene) of MXene may be promoted by any appropriate post-treatment (for example, ultrasonic treatment, handshaking, or the like) as appropriate.

MXene as represented by the above formula $M_mX_n$ can be expressed as follows:

Sc$_2$C, Ti$_2$C, Ti$_2$N, Zr$_2$C, Zr$_2$N, Hf$_2$C, Hf$_2$N, V$_2$C, V$_2$N, Nb$_2$C, Ta$_2$C, Cr$_2$C, Cr$_2$N, Mo$_2$C, Mo$_{1.3}$C, Cr$_{1.3}$C, (Ti, V)$_2$C, (Ti,Nb)$_2$C, W$_2$C, W$_{1.3}$C, Mo$_2$N, Nb$_{1.3}$C, Mo$_{1.3}$Y$_{0.6}$C (in the above formula, "1.3" and "0.6" mean about 1.3 (=4/3) and about 0.6 (=2/3), respectively.), Ti$_3$C$_2$, Ti$_3$N$_2$, Ti$_3$(CN), Zr$_3$C$_2$, (Ti, V)$_3$C$_2$, (Ti$_2$Nb) C$_2$, (Ti$_2$Ta) C$_2$, (Ti$_2$Mn) C$_2$, Hf$_3$C$_2$, (Hf$_2$V) C$_2$, (Hf$_2$Mn) C$_2$, (V$_2$Ti) C$_2$, (Cr$_2$Ti) C$_2$, (Cr$_2$V) C$_2$, (Cr$_2$Nb) C$_2$, (Cr$_2$Ta) C$_2$, (Mo$_2$Sc) C$_2$, Mo$_2$Ti) C$_2$, (Mo$_2$Zr) C$_2$, (Mo$_2$Hf) C$_2$, (Mo$_2$V) C$_2$, (Mo$_2$Nb) C$_2$, (Mo$_2$Ta) C$_2$, (W$_2$Ti) C$_2$, (W$_2$Zr) C$_2$, (W$_2$Hf) C$_2$, Ti$_4$N$_3$, V$_4$C$_3$, Nb$_4$C$_3$, Ta$_4$C$_3$, (Ti, Nb)$_4$C$_3$, (Nb, Zr)$_4$C$_3$, (Ti$_2$Nb$_2$) C$_3$, (Ti$_2$Ta$_2$) C$_3$, (V$_2$Ti$_2$) C$_3$, (V$_2$Nb$_2$) C$_3$, (V$_2$Ta$_2$) C$_3$, (Nb$_2$Ta$_2$) C$_3$, (Cr$_2$Ti$_2$) C$_3$, (Cr$_2$V$_2$) C$_3$, (Cr$_2$Nb$_2$) C$_3$, (Cr$_2$Ta$_2$) C$_3$, (Mo$_2$Ti$_2$) C$_3$, (Mo$_2$Zr$_2$) C$_3$, (Mo$_2$Hf$_2$) C$_3$, (Mo$_2$V$_2$) C$_3$, (Mo$_2$Nb$_2$) C$_3$, (Mo$_2$Ta$_2$) C$_3$, (W$_2$Ti$_2$) C$_3$, (W$_2$Zr$_2$) C$_3$, (W$_2$Hf$_2$) C$_3$.

Typically, in the above formula, M may be titanium or vanadium and X may be a carbon atom or a nitrogen atom. For example, the MAX phase is Ti$_3$AlC$_2$, and MXene is Ti$_3$C$_2$T$_s$ (in other words, M is Ti, X is C, n is 2, and m is 3).

In the present invention, MXene may contain a relatively small amount of remaining A atoms, for example, 10% by mass or less with respect to the original A atoms. The residual amount of A atoms may be preferably 8% by mass or less, and more preferably 6% by mass or less. However, even if the residual amount of A atoms exceeds 10% by mass, there may be no problem depending on the application and use conditions of conductive films.

Figure 2A:
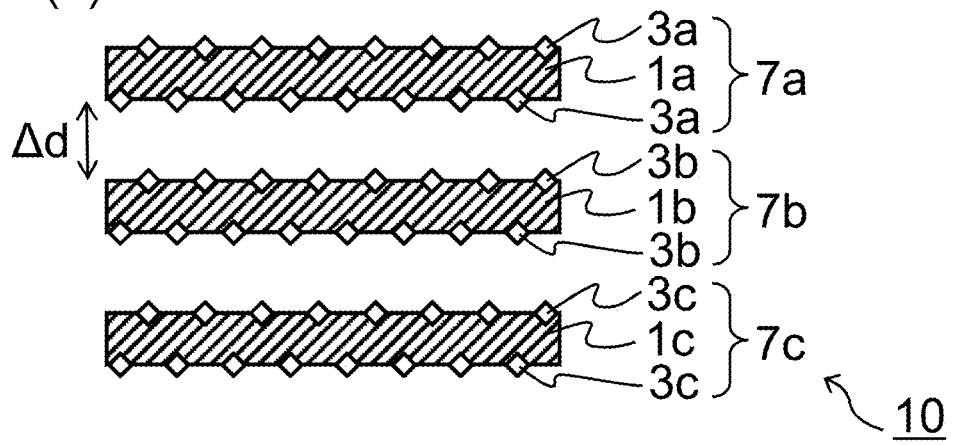
FIGS. 2(a) to 2(c) are process diagrams for explaining a method for producing a conductive material according to one embodiment of the present invention.

As schematically illustrated in FIG. 2(a), the MXene 10 thus obtained may be a layered material (in the drawing, three layers are exemplarily illustrated, but not limited thereto) including one or more MXene layers 7a, 7b, and 7c. More specifically, the MXene layers 7a, 7b, and 7c have layer bodies ($M_mX_n$ layers) 1a, 1b, and 1c represented by $M_mX_n$, and modifier or terminals T 3a, 3b, and 3c existing on the surfaces (more specifically, at least one of two surfaces facing each other in each layer) of the layer bodies 1a, 1b, and 1c. Therefore, the MXene layers 7a, 7b, and 7c are also represented as "$M_mX_nT_s$", and s is an optional number. The MXene 10 may be one in which such MXene layers are individually separated and exist in one layer (the single-layer structure, so-called single-layer MXene), a laminate in which a plurality of MXene layers are stacked apart from each other (the multilayer structure, so-called multilayer MXene), or a mixture thereof. The MXene 10 may be particles (which may also be referred to as powder or flakes) as an aggregate formed of the single-layer MXene and/or the multilayer MXene. In the case of multilayer MXene, two adjacent MXene layers (for example, 7a and 7b, and 7b and 7c) do not necessarily have to be completely separated from each other, and may be partially in contact with each other.

Although the present embodiment is not limited, the thickness of each layer of MXene (which corresponds to the MXene layers 7a, 7b, and 7c) is, for example, 0.8 nm to 5 nm, and particularly 0.8 nm to 3 nm (which may mainly vary depending on the number of M atom layers included in each layer), and the maximum dimension in a plane parallel to the layer (two-dimensional sheet plane) is, for example, 0.1 μm to 200 μm, and particularly 1 μm to 40 μm. When the MXene is a laminate (multilayer MXene), for each laminate, an interlayer distance (alternatively, a gap dimension, indicated by Δd in FIG. 2(a)) is, for example, 0.8 nm to 10 nm, particularly 0.8 nm to 5 nm, and more particularly about 1 nm. The total number of layers may be not less than 2, and is, for example, 50 to 100,000, particularly 1,000 to 20,000. The thickness in the lamination direction is, for example, 0.1 μm to 200 μm, particularly 1 μm to 40 μm. The maximum dimension in a plane (two-dimensional sheet plane) perpendicular to the lamination direction is, for example, 0.1 μm to 100 μm, and particularly 1 μm to 20 μm. Note that these dimensions can be obtained as a number average dimension (for example, a number average of at least 40) based on a photograph of a scanning electron microscope (SEM), a transmission electron microscope (TEM), or an atomic force microscope (AFM) or a distance in a real space calculated from a position on a reciprocal lattice space of a (002) plane measured by an X-ray diffraction (XRD) method.

As a result, as one or more particles formed of MXene, for example, particles made of the MXene 10 as illustrated in FIG. 2(a) can be obtained. Usually, MXene powder can be obtained from MAX powder.

Figure 2B:
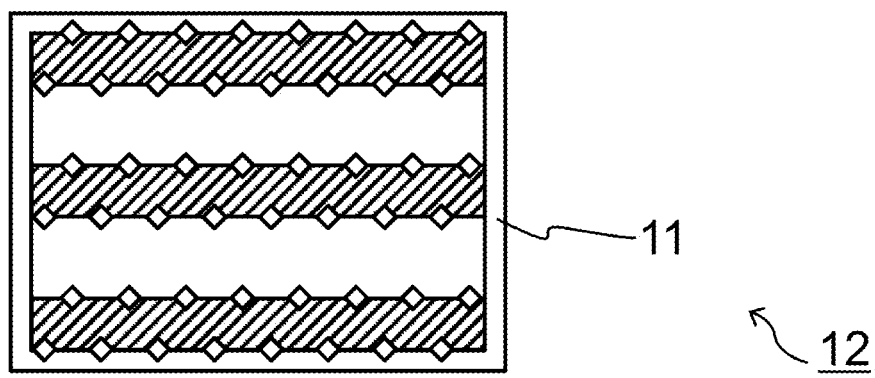

Then, one or more particles formed of the MXene 10 are covered with a metal material to obtain one or more precursor particles 12 as illustrated in FIG. 2(b), for example. As a method for covering the particles of the MXene 10 (MXene powder) with the metal material 11, for example, a barrel sputtering method can be applied, and the method can be performed using an apparatus having a configuration as described in JP H02-153068 A.

Figure 2C:
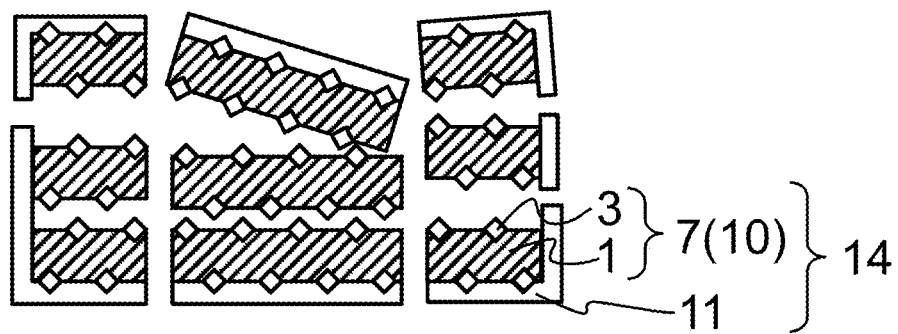

Next, the one or more precursor particles obtained above are pulverized to obtain a plurality of particles 14 where the MXene 10 is at least partially covered with the metal material 11, for example, as illustrated in FIG. 2(c). The pulverization method is not particularly limited, and for example, a method for mixing precursor particles with an optionally appropriate liquid medium (for example, water, an organic solvent, an ionic liquid, or the like) and applying a force (for example, a shearing force) by a homogenizer, an ultrasonic device, or the like can be applied. The plurality of particles 14 thus obtained may include the first particle(s) 13 (refer to FIG. 1(a)) in which a part of the MXene 10 is covered with the metal material 11 and the rest is exposed. More specifically, the plurality of particles 14 may include particles in which one of two opposing planes of the MXene 10 is covered with the metal material 11 and the other plane is exposed, particles in which an end of the MXene 10 (end surface along the thickness direction of MXene) is covered with the metal material 11, or the like.

If desired, the plurality of particles obtained above may be formed into a film-like form. The forming method is not particularly limited, and suction filtration or the like can be applied. In addition, various methods such as spray coating, bar coating, and dip coating can be applied.

As described above, the conductive material (conductive film as desired) of the present embodiment can be produced. The method for producing the conductive material can be carried out at room temperature (without requiring firing as described in Patent Literature 1), and the composite (coating) of MXene and the metal material can be carried out by a dry process (without requiring a liquid phase process as described in Patent Literature 2).

Embodiment 2

The present embodiment relates to an electrochemical capacitor.

According to the present embodiment, there is provided an electrochemical capacitor comprising two electrodes disposed apart from each other in an electrolytic solution, at least one of the two electrodes containing the conductive material (conductive film as desired) described above in Embodiment 1.

Figure 3:
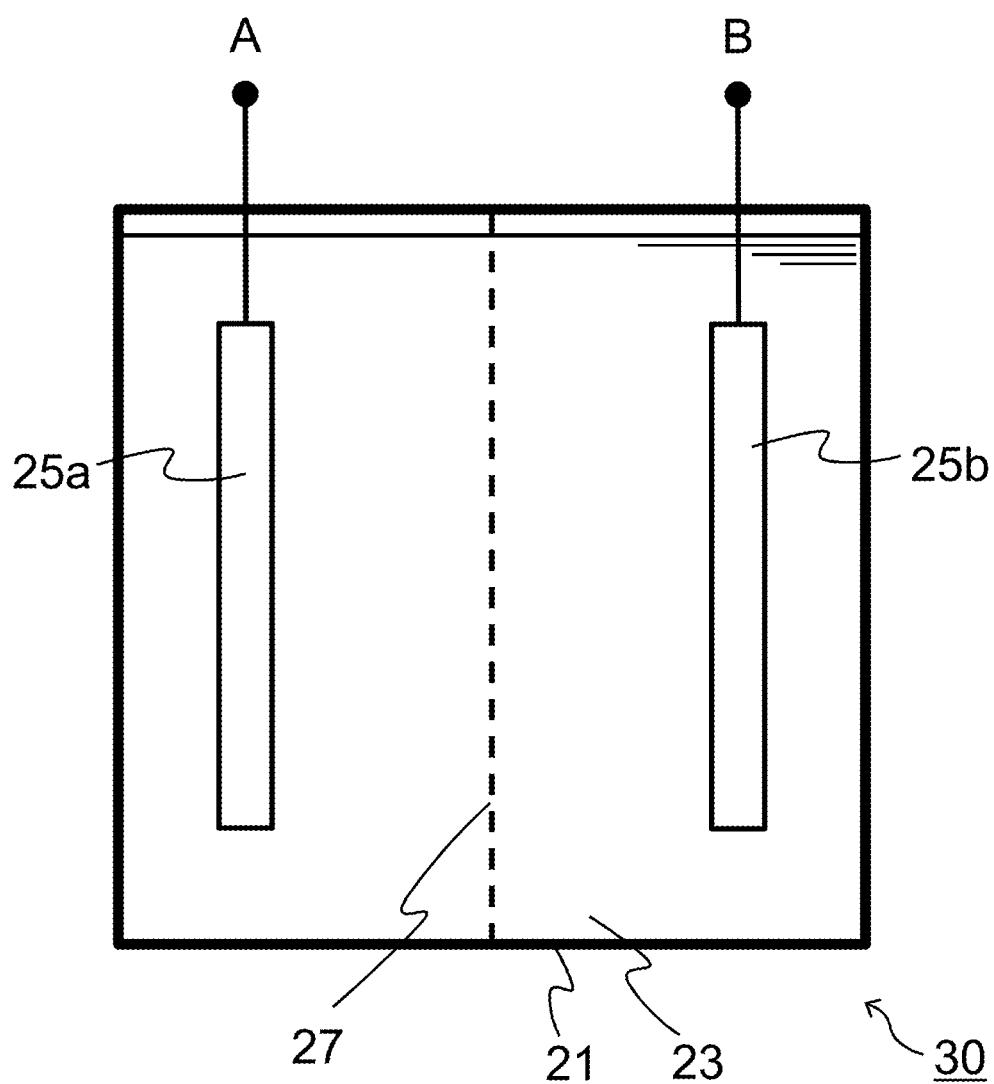
FIG. 3 is a schematic cross-sectional view for explaining an electrochemical capacitor according to one embodiment of the present invention.

Referring to FIG. 3, an electrochemical capacitor 30 of the present embodiment has a configuration in which two electrodes 25a and 25b are disposed in an electrolytic solution 23 to be apart from each other. The electrodes 25a and 25b can be electrically connected to terminals A and B, respectively. In the illustrated aspect, the electrodes 25a and 25b may be disposed in any suitable container (or cell) 21, for example, apart from each other with a separator 27 interposed therebetween (although not essential to the present embodiment) in the electrolytic solution 23. As the separator 27, any appropriate member can be used as long as movement of electrolyte ions in the electrolytic solution 23 is not hindered, and for example, a porous membrane of polyolefin such as polypropylene or polytetrafluoroethylene can be used. The material of the container 21 is not particularly limited, and may be, for example, metal such as stainless steel, a resin such as polytetrafluoroethylene, or any other appropriate material. The container 21 may be sealed or open and may or may not have an empty space within the container 21. Note that the electrodes 25a and 25b may be disposed apart from each other in any appropriate form other than the illustrated form, such as being stacked and wound with the separator 27 interposed therebetween in the container 21.

At least one of the electrodes 25a and 25b contains the conductive material (conductive film as desired, the same applies hereinafter in the present embodiment) described above in Embodiment 1 as the electrode active material. The electrode active material refers to a material that exchanges electrons with electrolyte ions in the electrolytic solution 23.

At least one of the electrodes 25a and 25b may be substantially formed of the conductive material described above in Embodiment 1, or may be formed by adding a binder or the like thereto. The binder may be typically a resin, and for example, at least one selected from the group consisting of polytetrafluoroethylene, polyvinylidene fluoride, styrene butadiene rubber, and the like may be used.

When the conductive material described above in Embodiment 1 is used for only one of the electrodes 25a and 25b, the other electrode may contain any appropriate material that can function as a counter electrode as an electrode active material. For example, the other electrode contains carbon as an electrode active material, for example, activated carbon, graphite, carbon nanotube, graphene, carbon black, and the like. In this case, the one electrode functions as a negative electrode, and the other electrode functions as a positive electrode. The other electrode may be substantially formed of only the electrode active material, or may be formed by adding a binder or the like thereto. The binder may be typically a resin, and for example, at least one selected from the group consisting of polytetrafluoroethylene, polyvinylidene fluoride, styrene butadiene rubber, and the like may be used.

The electrodes 25a and 25b may be formed, independently of one another, in the form of a free-standing film or in the form of a film on a current collector (not shown). Any suitable conductive material may be used for the current collector, but the current collector may be formed of, for example, stainless steel, aluminum, an aluminum alloy, or the like.

As the electrolytic solution 23, any appropriate electrolytic solution can be used, and the electrolytic solution may be either an aqueous electrolytic solution (an electrolytic solution in which an electrolyte is dissolved in an aqueous solvent) or a non-aqueous electrolytic solution (an electrolytic solution in which an electrolyte is dissolved in a non-aqueous solvent, or an electrolytic solution including/composed of an ionic liquid). A non-aqueous electrolytic solution is preferable from the viewpoint that a larger operation potential range and a usable temperature range can be obtained. The electrolytic solution 23 may contain any suitable additives in relatively small amounts.

As the electrolytic solution 23 containing a solvent, for example, specific examples of the following combination can be mentioned.

(1) A non-aqueous electrolytic solution containing lithium borofluoride (Li—$BF_4$) (that is, a dopant ion is a tetrafluoroborate ion ($BF_4$ anion)) as an electrolyte and propylene carbonate (PC) as a solvent.

(2) A non-aqueous electrolytic solution containing lithium bis(trifluoromethanesulfonyl) imide (Li—TFSI) (that is, the dopant ion is a bis(trifluoromethanesulfonyl) imide ion (TFSI anion)) as an electrolyte and propylene carbonate (PC) as a solvent.

(3) A non-aqueous electrolytic solution containing lithium bis(fluorosulfonyl) imide (Li—FSI) (that is, the dopant ion is a bis(fluorosulfonyl) imide ion (FSI anion)) as an electrolyte and propylene carbonate (PC) as a solvent.

(4) A non-aqueous electrolytic solution containing lithium trifluoromethanesulfonate (Li—$CF_3SO_3$) (that is, the dopant ion is a trifluoromethanesulfonate ion ($CF_3SO_3$ anion)) as an electrolyte and propylene carbonate (PC) as a solvent.

(5) A non-aqueous electrolytic solution containing lithium hexafluorophosphate (Li—$PF_6$) (that is, the dopant ion is a hexafluorophosphate ion ($PF_6$ anion)) as an electrolyte and propylene carbonate (PC) as a solvent.

(6) A non-aqueous electrolytic solution containing lithium borofluoride (Li—$BF_4$) (that is, the dopant ion is a tetrafluoroborate ion ($BF_4$ anion)) as an electrolyte and ethylene carbonate (EC) and diethyl carbonate (DEC) as a solvent.

(7) A non-aqueous electrolytic solution containing lithium bis(trifluoromethanesulfonyl) imide (Li-TFSI) (that is, the dopant ion is a bis(trifluoromethanesulfonyl) imide ion (TFSI anion)) as an electrolyte, and ethylene carbonate (EC) and diethyl carbonate (DEC) as a solvent.

(8) A non-aqueous electrolytic solution containing lithium bis(fluorosulfonyl) imide (Li—FSI) (that is, the dopant ion is a bis(fluorosulfonyl) imide ion (FSI anion)) as an electrolyte, and ethylene carbonate (EC) and diethyl carbonate (DEC) as a solvent.

(9) A non-aqueous electrolytic solution containing lithium trifluoromethanesulfonate (Li—$CF_3SO_3$) (that is, the dopant ion is a trifluoromethanesulfonate ion ($CF_3SO_3$ anion)) as an electrolyte, and ethylene carbonate (EC) and diethyl carbonate (DEC) as a solvent.

(10) A non-aqueous electrolytic solution containing lithium hexafluorophosphate (Li—$PF_6$) (that is, the dopant ion is a hexafluorophosphate ion ($PF_6$ anion)) as an electrolyte, and ethylene carbonate (EC) and diethyl carbonate (DEC) as a solvent.

(11) A non-aqueous electrolytic solution containing lithium borofluoride (Li—$BF_4$) (that is, a dopant ion is a tetrafluoroborate ion ($BF_4$ anion)) as an electrolyte and gamma butyrolactone (gBL) as a solvent.

(12) A non-aqueous electrolytic solution containing lithium bis(trifluoromethanesulfonyl) imide (Li-TFSI) (that is, the dopant ion is a bis(trifluoromethanesulfonyl) imide ion (TFSI anion)) as an electrolyte and gamma butyrolactone (gBL) as a solvent.

(13) A non-aqueous electrolytic solution containing lithium bis(fluorosulfonyl) imide (Li—FSI) (that is, the dopant ion is a bis(fluorosulfonyl) imide ion (FSI anion)) as an electrolyte and gamma butyrolactone (gBL) as a solvent.

(14) A non-aqueous electrolytic solution containing lithium trifluoromethanesulfonate (Li—$CF_3SO_3$) (that is, the dopant ion is a trifluoromethanesulfonate ion ($CF_3SO_3$ anion)) as an electrolyte and gamma butyrolactone (gBL) as a solvent.

(15) A non-aqueous electrolytic solution containing lithium hexafluorophosphate (Li—$PF_6$) (that is, the dopant ion is a hexafluorophosphate ion ($PF_6$ anion)) as an electrolyte and gamma butyrolactone (gBL) as a solvent.

(16) An aqueous electrolytic solution containing sulfuric acid ($H_2SO_4$) (that is, the dopant ion is a sulfonate ion ($SO_4$ anion)) as an electrolyte and water as a solvent.

(17) An aqueous electrolytic solution containing lithium borofluoride (Li—$BF_4$) (that is, a dopant ion is a tetrafluoroborate ion ($BF_4$ anion)) as an electrolyte and a sulfuric acid ($H_2SO_4$) aqueous solution as a solvent Terminals A and B of the electrochemical capacitor 30 can be connected to a load to perform discharging. In addition, the terminals A and B of the electrochemical capacitor 30 can be connected to a power supply to perform charging.

In the electrochemical capacitor of the present embodiment, the conductive material described above in Embodiment is used as the electrode active material. According to the conductive material described above in Embodiment 1, the effect of the modifier or terminal T present on the surface of MXene can be utilized. With this, capacitance (for example, pseudo capacitance by redox reaction) can be developed, and thus the conductive material can be suitably functioned as an electrochemical capacitor (so-called "pseudo capacitor" or "redox capacitor"). In addition, according to the conductive material described above in Embodiment 1, it is possible to improve the conductivity of MXene in the thickness direction and, consequently, the conductivity of the electrode (which may be in the form of a conductive film) in the thickness direction, and thus, it is possible to improve the capacitor characteristics of the electrochemical capacitor, more specifically, the capacity per unit mass (F/g). In particular, by setting the proportion of the metal material in the plurality of particles constituting the conductive material to 1% to 30% by mass, excellent capacitor characteristics, more specifically, significantly large capacity per unit mass can be realized.

In the electrochemical capacitor of the present embodiment, MXene is used as an electrode active material. In the case of using MXene, as compared with the case of using $MnO_2$, the specific capacity is less likely to decrease even when the electrode thickness is increased to some extent, and preferably a large capacitance can be secured. Therefore, the electrode thickness can be further increased. For example, the electrode thickness is 3 μm or more, particularly 5 μm or more, and the upper limit is not particularly limited, and typically 50 μm or less.

EXAMPLES

Example 1

A conductive material having a film-like form, that is, a conductive film was produced by the following procedure.

Preparation of MAX Powder

A TiC powder, a Ti powder, and an Al powder (all available from Kojundo Chemical Laboratory Co., Ltd.) were put in a ball mill containing zirconia balls at a molar ratio of 2:1:1, and mixed for 24 hours. The obtained mixed powder was fired at 1350° C. for 2 hours under an Ar atmosphere. The fired body (block) thus obtained was pulverized with an end mill to a maximum dimension of not more than 40 μm. As a result, a $Ti_3AlC_2$ powder was obtained as a MAX powder.

Preparation of MXene Powder 1 g of the $Ti_3AlC_2$ powder obtained above was weighed, added to 10 mL of 9 mol/L hydrochloric acid together with 1 g of LiF, and stirred with a stirrer at 35° C. for 24 hours to obtain a solid-liquid mixture (suspension) containing a solid component derived from the $Ti_3AlC_2$ powder. As to thus obtained mixture, an operation of washing with pure water and separating and removing a supernatant liquid by decantation using a centrifuge (remaining sediment excluding the supernatant is washed again) was repeated about 10 times. Then, the mixture obtained by adding pure water to the precipitate was stirred with an automatic shaker for 15 minutes, and then subjected to centrifugal separation operation for 5 minutes with a centrifuge to separate the mixture into a supernatant and a precipitate, and the supernatant was separated and removed by centrifugal dehydration. The resulting precipitate was subjected to freeze drying, and the aggregated dry powder was pulverized with a mill. As a result, a $Ti_3C_2T_s$ powder was obtained as a MXene powder (refer to FIG. 2(*a*)).

Preparation of Precursor Particles (Covering of MXene Powder with Metal Material)

The $Ti_3C_2T_s$ powder (dry powder) obtained above was covered with a coating of a metal material by a barrel sputtering method using an apparatus having a configuration as disclosed in JP H02-153068 A. More specifically, 30 cc of the $Ti_3C_2T_s$ powder obtained as described above was weighed and put into a processing container (sputtering chamber), the pressure in the processing container was reduced to $1 \times 10^{-3}$ Pa (absolute pressure), and then an Ar gas was supplied until the total pressure reached 1 Pa (absolute pressure). Cu was sputtered on the $Ti_3C_2T_s$ powder at an output of 100 W for 1 hour while causing the processing container to perform a pendulum motion at a peripheral speed of 20°/sec, an angle of ±20°, and a waiting time of 2 seconds, and causing the stirring jig to perform a pendulum motion at a peripheral speed of 80°/sec, an angle of ±90°, and a waiting time of 2 seconds. As a result, precursor particles in which the Ti$_3$C$_2$T$_s$ powder was entirely covered with Cu as a metal material were obtained (refer to FIG. 2(b)).

Pulverization of Precursor Particles and Film Forming

Figure 5A:
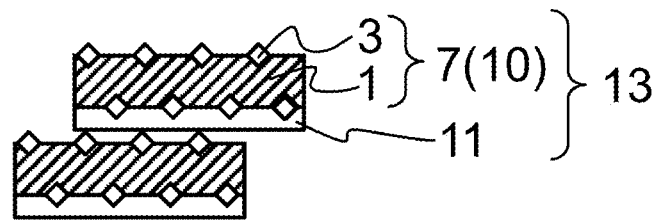
FIG. 5(a) is a schematic cross-sectional view for explaining a composite state of MXene particles and a metal material in Example 1.

Pure water was added to the precursor particles obtained above, and the mixture was pulverized by a homogenizer (as a result, particles in which the Ti$_3$C$_2$T$_s$ powder was partially covered with Cu were obtained (refer to FIG. 2(c))). Subsequently, the liquid component was removed by suction filtration, and the remaining solid component was formed into a film-like form. In this way, a conductive film of this example was produced. In this conductive film, as schematically illustrated in FIG. 5(a), it is understood that a metal material 11 is in surface contact with the particles of MXene 10.

Example 2

A conductive film was produced in the same manner as in Example 1 except that Cu was sputtered on the Ti$_3$C$_2$T$_s$ powder for 10 hours in the "Preparation of precursor particles".

Comparative Example 1

A conductive film was produced in the same manner as in Example 1 except that a Ti$_3$C$_2$T$_s$ powder obtained as a MXene powder was used instead of the precursor particles in the "Pulverization of precursor particles and film forming", without performing the "Preparation of precursor particles".

Comparative Example 2

Figure 5B:
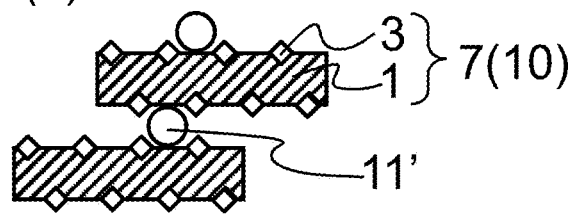
FIG. 5(b) is a schematic cross-sectional view for explaining a composite state of MXene particles and metal particles in Comparative Example 2.

A Ti$_3$C$_2$T$_s$ powder was prepared as a MXene powder in the same manner as in Example 1. Thereafter, water was added to the Ti$_3$C$_2$T$_s$ powder obtained as the MXene powder (without performing the "Preparation of precursor particles" and the "Pulverization of precursor particles and film forming") to prepare a slurry (0.01% by mass of the Ti$_3$C$_2$T$_s$ powder), and to 50 mL of this slurry (0.050 g of the Ti$_3$C$_2$T$_s$ powder), 1.5 mg of nanoparticles formed of Cu (nano-Cu particles, available from Sigma-Aldrich, particle size 40 to 60 nm) was added, and mixed by a magnetic stirrer for 1 hour. A liquid component was removed from the resulting mixture by suction filtration, and the remaining solid component was formed into a film-like form. In this way, a conductive film was produced. In this conductive film, as schematically illustrated in FIG. 5(b), it is understood that a metal particle(s) 11' is in point contact with the particle(s) of MXene 10.

Example 3

A conductive film was produced in the same manner as in Example 1 except that Ag was sputtered for 40 minutes on the Ti$_3$C$_2$T$_s$ powder in "Preparation of precursor particles" in order to coat Ag instead of Cu as a metal material.

Example 4

A conductive film was produced in the same manner as in Example 1 except that Ti was sputtered for 7 hours on the Ti$_3$C$_2$T$_s$ powder in "Preparation of precursor particles" in order to coat Ti instead of Cu as a metal material.

Example 5

A conductive film was produced in the same manner as in Example 1 except that Ni was sputtered for 2.5 hours on the Ti$_3$C$_2$T$_s$ powder in "Preparation of precursor particles" in order to coat Ni instead of Cu as a metal material.

The conductive films (and optionally, the precursor particles used for the production of the conductive film) of examples and comparative examples produced above were evaluated as follows.

Content of Each Metal Element in Precursor Particles

For the precursor particles used for producing the conductive film of Examples 1 and 2, the contents (% by mass) of Ti and Cu were determined based on the ratio of the amounts of the respective elements Ti and Cu measured by inductively coupled plasma atomic emission spectrometry (ICP-AES) (since T present on the surface of Ti$_3$C$_2$ is relatively small, it is negligible in calculating the content). The results are shown in Table 1.

For reference, for the Ti$_3$C$_2$T$_s$ powder used for producing the conductive film of Comparative Example 1 and the nano-Cu particle-added Ti$_3$C$_2$T$_s$ powder used for producing the conductive film of Comparative Example 2, the contents (% by mass) of Ti and Cu were measured in the same manner as described above. The results are shown in Table 1. In Table 1, the symbol "ND" indicates that it was less than the detection limit (0.005% by mass).

TABLE 1

| | Content (% by mass) | |
|---|---|---|
| | Ti | Cu |
| Example 1 | 55.2 | 2.7 |
| Example 2 | 41.8 | 29.7 |
| Comparative Example 1 | 60.5 | ND |
| Comparative Example 2 | 54.6 | 2.8 |

Referring to Table 1, in the precursor particles used in Examples 1 and 2 (precursor particles obtained by covering the Ti$_3$C$_2$T$_s$ powder with Cu), the contents of Cu were 2.7% by mass and 29.7% by mass. The content (proportion) of Cu in the precursor particles may be considered to be substantially equal to the content (proportion) of Cu in the particles after pulverization (particles in which the Ti$_3$C$_2$T$_s$ powder is partially covered with Cu).

In addition, for the precursor particles used for producing the conductive film of Examples 3 to 5, the contents (% by mass) of Ti, Ag, and Ni were determined based on the ratio of the amounts of the respective elements Ti, Ag, and Ni measured by inductively coupled plasma atomic emission spectrometry (ICP-AES). The results are shown in Table 2. In Table 2, the symbol "ND" indicates that it was less than the detection limit (0.005% by mass).

TABLE 2

| | Content (% by mass) | | |
|---|---|---|---|
| | Ti | Ag | Ni |
| Example 3 | 57.6 | 3.0 | ND |
| Example 4 | 60.6 | ND | ND |
| Example 5 | 57.9 | ND | 2.6 |

In the precursor particles used for producing the conductive film of Example 4, it was estimated that 4.1% by mass of the total Ti content of 60.6% by mass is a portion constituting a Ti covering, and the remaining 56.5% by mass is a portion constituting a Ti$_3$C$_2$T$_s$ powder (without covering). This estimate was based on the results (Table 3) of quantitative analysis of the contents (% by mass) of C and Ti in the precursor particles used for producing the conductive films of Example 4 and Comparative Example 1, using a scanning electron microscope-energy dispersive X-ray analyzer (SEM-EDX). Assuming that the precursor particles of Comparative Example 1 were a $Ti_3C_2T_s$ powder, and that the precursor particles of Example 4 were formed of a portion constituting a $Ti_3C_2T_s$ powder (without covering) having the same Ti/C as that of the precursor particles of Comparative Example 1 and a portion constituting the Ti covering, Ti/C standardized with C of $Ti_3C_2$ was calculated from the above quantitative analysis results (since the amount of T existing on the surface of $Ti_3C_2$ is relatively small, it is also negligible in this estimate), and the above estimate was obtained (refer to Table 3 and the following formula).

TABLE 3

|  | Content (% by mass) | | Standardized |
|---|---|---|---|
|  | Ti | C | Ti/C |
| Example 4 | 82.1 | 11.1 | 7.4 |
| Comparative Example 1 | 83.3 | 12.0 | 6.9 |

60.6:x=7.4:6.9
x=56.5
60.6−56.5=4.1

Covering Thickness of Metal Material in Precursor Particle

The covering thickness of the metal material (Cu in Examples 1 and 2, Ag in Example 3, Ti in Example 4, Ni in Example 5, and the same applies hereinafter) in the precursor particle can be determined by imaging a cross section of the precursor particle with a scanning electron microscope-energy dispersive X-ray analyzer (SEM-EDX) and measuring the covering layer thickness of the metal material at a plurality of locations (if necessary, calculating an average value).

Figure 4A:
FIG. 4(a) is an SEM image of the precursor particle used for producing the conductive film in Example 1 of the present invention.
Figure 4B:
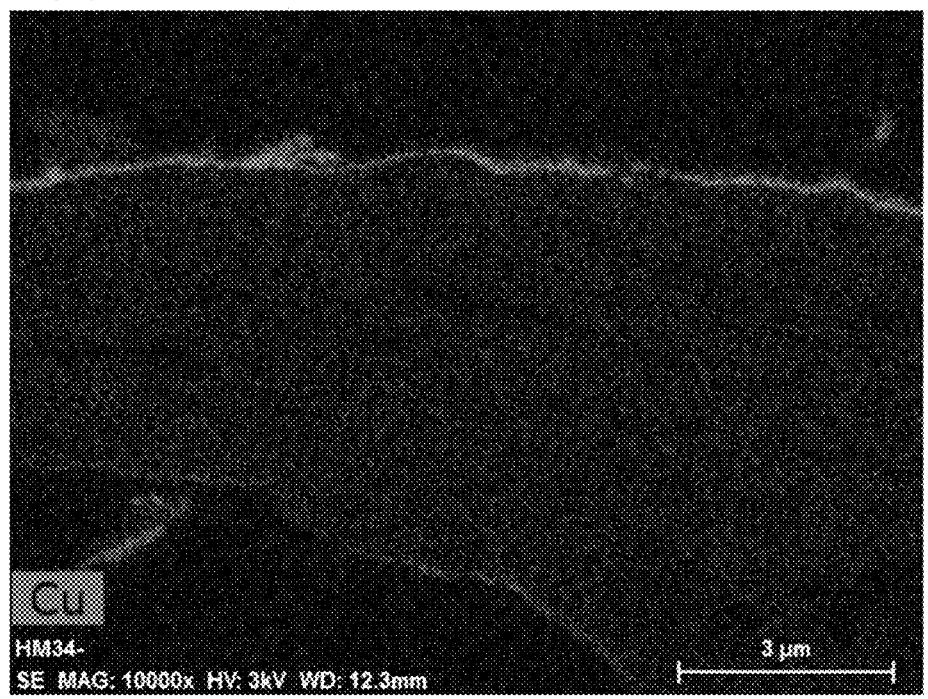
FIG. 4(b) is an image obtained by EDX analysis of the SEM image in FIG. 4(a) for Cu.

Typically, a SEM-EDX image of the precursor particle used for producing the conductive film of Example 1 is illustrated in FIG. 4. The covering thickness of Cu in the precursor particle used for producing the conductive film of Example 1 was 100 to 500 nm. The covering thickness of Cu in the precursor particle used for producing the conductive film of Example 2 was 100 to 500 nm as measured in the same manner as described above. The covering thickness of Ag in the precursor particle used for producing the conductive film of Example 3, the covering thickness of Ti in the precursor particle used for producing the conductive film of Example 4, and the covering thickness of Ni in the precursor particle used for producing the conductive film of Example 5 were 100 to 500 nm as measured in the same manner as described above.

The covering thickness of the metal material in the precursor particle(s) may be considered to be substantially equal to the covering thickness of the metal material in the particle(s) after pulverization (particle(s) in which the $Ti_3C_2T_s$ powder is partially covered with the metal material).

Thickness of Conductive Film

The thickness (μm) of each of the conductive films produced in Examples 1 and 2, Comparative Examples 1 and 2, and Examples 3 to 5 was measured with a micrometer. The results are shown in Table 4.

Density of Conductive Film

The density (g/cm$^3$) of each of the conductive films produced in Examples 1 and 2, Comparative Examples 1 and 2, and Examples 3 to 5 was calculated from the weight and volume of the film. The results are shown in Table 4.

Volume Resistance in Thickness Direction of Conductive Film and Volume Occupancy Conversion Value Using a resistivity meter (Loresta-AX MCP-T370 and BSP probe available from Mitsubishi Chemical Analytech Co., Ltd.), a probe was brought into contact with both surfaces of the conductive film to measure the volume resistivity (Ωcm) of the conductive film in the thickness direction. Further, the product of the volume resistivity (Ωcm) and the volume occupancy (%) obtained from the density (g/cm$^3$) was defined as a volume occupancy conversion value (Ωcm) of the volume resistivity. The results are shown in Table 4.

TABLE 4

|  | Thickness (μm) | Density (g/cm$^3$) | Volume resistivity in thickness direction (Ωcm) | Volume occupancy conversion value of volume resistivity in thickness direction (Ωcm) |
|---|---|---|---|---|
| Example 1 | 30 | 0.66 | 77.2 | 11.62 |
| Example 2 | 28 | 0.71 | 40.0 | 5.69 |
| Comparative Example 1 | 13 | 1.49 | 95.0 | 33.70 |
| Comparative Example 2 | 15 | 1.52 | 85.0 | 29.41 |
| Example 3 | 29 | 1.02 | 78.5 | 18.66 |
| Example 4 | 30 | 0.97 | 76.5 | 17.66 |
| Example 5 | 30 | 0.95 | 77.9 | 17.41 |

Referring to Table 4, in the conductive films of Examples 1 and 2 produced by pulverizing the precursor particles in which the $Ti_3C_2T_s$ powder was covered with Cu, the volume occupancy conversion values of the volume resistivity in the thickness direction were 11.62 Ωcm and 5.69 Ωcm, respectively, which were remarkably reduced as compared with 29.41 Ωcm of the conductive film of Comparative Example 1. Even in the conductive film of Example 3 produced by pulverizing the precursor particles obtained by covering the $Ti_3C_2T_s$ powder with Ag, the conductive film of Example 4 produced by pulverizing the precursor particles obtained by coating the $Ti_3C_2T_s$ powder with Ti, and the conductive film of Example 5 produced by pulverizing the precursor particles obtained by covering the $Ti_3C_2T_s$ powder with Ni, the volume occupancy conversion value of the volume resistivity in the thickness direction was remarkably reduced as compared with the conductive film of Comparative Example 1.

Example 6

An electrochemical capacitor was assembled as an evaluation cell (three-pole Swagelok cell) by the following procedure.

Working Electrode (Negative Electrode)

A conductive film was produced in the same manner as in Example 1. Next, the conductive film thus obtained was punched into a circle having a diameter of 8 mm to obtain an electrode main body (electrode active material), and the electrode main body was press-bonded to a circular current collector (foil made of SUS, 500 mesh) having a diameter of 10 mm to obtain a working electrode (negative electrode).

Counter Electrode (Positive Electrode)

An activated carbon electrode (AC) was used as a counter electrode (positive electrode). An activated carbon electrode was produced by mixing activated carbon (YP-50 available from Kuraray Co., Ltd.), carbon black (available from Sigma Aldrich) as a conductive aid, and a 60% by mass polytetrafluoroethylene aqueous solution (available from Sigma Aldrich) as a binder at a mass ratio of 75:15:10, forming the activated carbon-containing mixture into a film-like form with a roll, and further forming into a disk-like form having a diameter of 8 mm and a thickness of 0.25 mm.

Reference Electrode

An electrode body made of activated carbon cut into a rectangle having a length of about 5 mm and a width of about 3 mm and having a thickness of about 0.01 mm was fixed to a plate electrode (AE-4 available from EC Frontier Co., Ltd.) to serve as a reference electrode.

Separator

A separator film was prepared by processing a commercially available separator (CELGARD 3501 (trade name) available from CELGARD, LLC.) to have a diameter of 12 mm.

Electrolytic Solution

An electrolytic solution containing 1 mol/L (based on the whole) of lithium bis(trifluoromethanesulfonyl) imide (Li-TFSI) (available from Sigma Aldrich, product number 544094) as an electrolyte in propylene carbonate (PC) as a solvent was prepared.

Assembly of Electrochemical Capacitor

Swagelok tube fitting (Bored-Through Union Tee available from Swagelok Company, product number SS-810-3BT, made of SUS 316) was used as a cell body, a ferrule (PTFE Ferrule Set available from Swagelok Company, product number T-810-SET, made of polytetrafluoroethylene) and an extraction electrode (a round bar made of SUS 316 having a diameter of 12 mm and a length of 40 mm) were used in combination at each of two openings opposed to each other, and the remaining opening was sealed with a paraffin film to form a cell. In a dry room, the working electrode and the counter electrode prepared as described above were allowed to face each other inside the cell body as a negative electrode and a positive electrode, respectively, and a separator membrane was disposed to be interposed between the working electrode and the counter electrode. The extraction electrode equipped with the ferrule was inserted and fitted from each of the two opposed openings of the cell body until the extraction electrode was in contact with each of the electrodes. The electrolytic solution was filled in the cell body, the reference electrode was inserted from the remaining opening, and a gap therebetween was sealed with a paraffin film. As a result, an electrochemical capacitor was assembled as an evaluation cell (three-pole Swagelok cell).

Example 7, Comparative Examples 3 and 4 and Examples 8 and 9

An electrochemical capacitor was assembled in the same manner as in Example 6 except that a conductive film produced in the same manner as in Example 2, Comparative Examples 1 and 2, and Examples 3 and 4 was used instead of Example 1 in the production of the working electrode (refer to Table 5).

The electrochemical capacitors of examples and comparative examples produced above were evaluated (electrochemically measured) as follows.

In a dry room under a room temperature environment, an external electrode was connected to a working electrode and a reference electrode of the electrochemical capacitor assembled above, a sweep rate was set to 1 mV/s using an electrochemical measurement apparatus Multi Potentio/Galvano Stat VMP3 available from Bio-Logic Science Instruments SAS and software EC-Lab V 11.12, and a capacity per unit mass (F/g) (based on MXene) was calculated from cyclic voltammetry measurement. The results are shown in Table 5. In addition, typically, for the electrochemical capacitors of Example 6 and Comparative Example 3, the measurement results of impedance are illustrated in FIG. 6, and the measurement results of the capacitor characteristics are illustrated in FIG. 7.

TABLE 5

| | Working electrode | Capacity per unit mass (F/g) |
|---|---|---|
| Example 6 | Example 1 | 54.9 |
| Example 7 | Example 2 | 77.1 |
| Comparative Example 3 | Comparative Example 1 | 31.5 |
| Comparative Example 4 | Comparative Example 2 | 42.5 |
| Example 8 | Example 3 | 54.3 |
| Example 9 | Example 4 | 54.1 |
| Example 10 | Example 5 | 76.4 |

Figure 6:
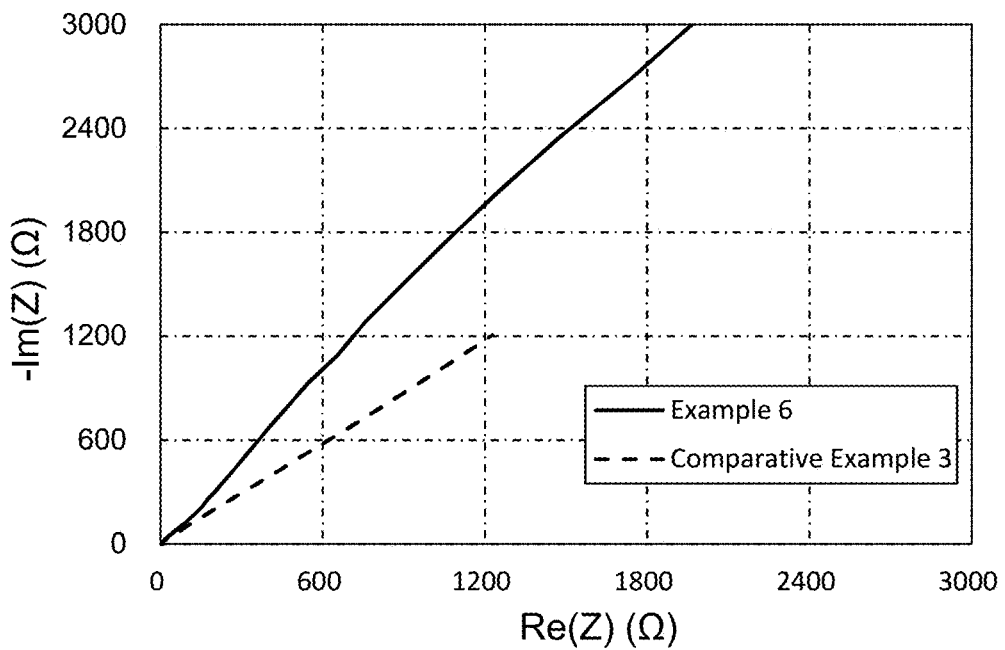
FIG. 6 is a graph illustrating impedance measurement results for electrochemical capacitors of Example 6 of the present invention and Comparative Example 3, in which a vertical axis represents an imaginary part −Im (Ω) of impedance Z, and a horizontal axis represents a real part Re (Ω) of impedance Z.
Figure 7:
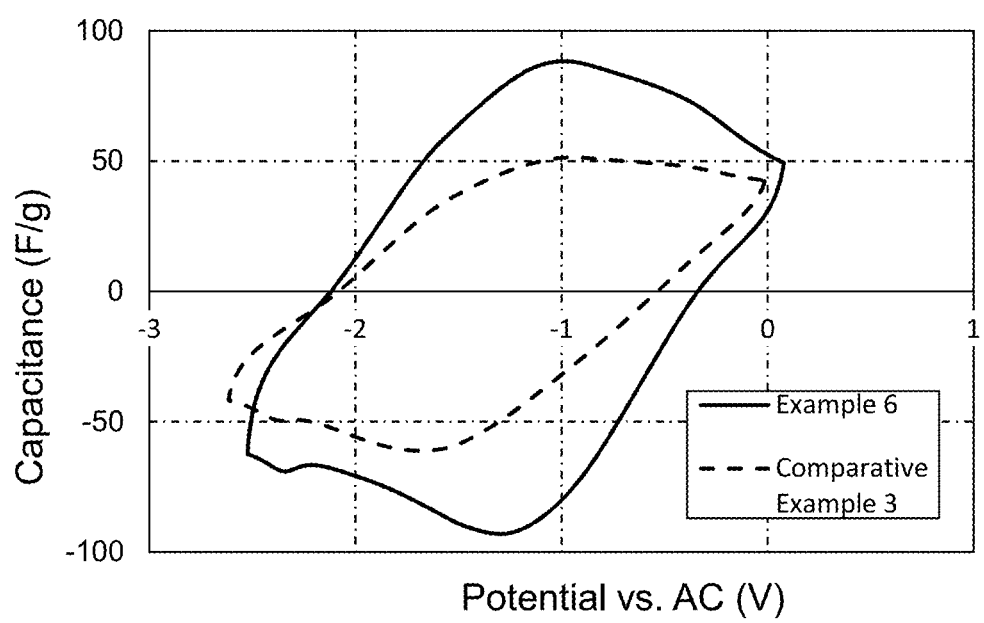
FIG. 7 is a graph illustrating measurement results of capacitor characteristics of the electrochemical capacitors according to Example 6 of the present invention and Comparative Example 3, in which the vertical axis represents a capacitance (F/g), and the horizontal axis represents a potential (V) with respect to an activated carbon electrode (AC).

As understood from FIG. 6, the impedance was lower in the electrochemical capacitor of Example 6 than in the electrochemical capacitor of Comparative Example 3.

Referring to FIG. 7 and Table 5, the electrochemical capacitor of Comparative Example 3 exhibited the smallest capacity per unit mass, the electrochemical capacitor of Examples 6 to 10 exhibited a capacity per unit mass larger than those of Comparative Examples 3 and 4, and the capacitor characteristics were improved.

The conductive material (conductive film as desired) of the present invention can be widely used in various applications as a material of any appropriate member requiring conductivity, and can be suitably used as, for example, a material of an electrode of an electrochemical capacitor, but is not limited to such applications.

REFERENCE SIGNS LIST 1, 1a, 1b, 1c $M_mX_n$ layer
3, 3a, 3b, 3c Modifier or terminal T
7, 7a, 7b, 7c MXene layer
10 MXene (layered material)
11 Metal material
11' Metal particle
12 Precursor particle
13 First particle
15 Second particle
17 Third particle
21 Container (cell)
23 Electrolytic solution
25a, 25b Electrode
27 Separator
30 Electrochemical capacitor
A, B Terminal

The invention claimed is:
1. A conductive material comprising:
a plurality of particles, the plurality of particles including at least a first particle comprising:

a layered material including one or plural layers, wherein the one or plural layers include a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and a metal material at least partially covering the layered material, wherein the first particle has a part of the layered material covered with the metal material and the rest of the layered material is exposed, and wherein in the first particle, one of two opposing planes of the layered material is covered with the metal material, and the other is exposed.

2. The conductive material according to claim 1, wherein the metal material has a higher conductivity than that of the layered material.

3. The conductive material according to claim 1, wherein M is at least one selected from the group consisting of Ti, Zr, Hf, V, Nb, Ta, Cr, and Mo.

4. The conductive material according to claim 1, wherein a proportion of the metal material in the plurality of particles is 1% to 30% by mass.

5. A conductive film comprising:
a film body comprising the conductive material according to claim 1.

6. An electrochemical capacitor comprising:
an electrolytic solution; and
two electrodes spaced apart from each other in the electrolytic solution, wherein at least one of the two electrodes comprises the conductive film according to claim 5.

7. An electrochemical capacitor comprising:
an electrolytic solution; and
two electrodes spaced apart from each other in the electrolytic solution, wherein at least one of the two electrodes comprises the conductive material according to claim 1.

8. A conductive material comprising:
a plurality of particles, the plurality of particles including at least a first particle comprising:
a layered material including one or plural layers, wherein the one or plural layers include a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and a metal material at least partially covering the layered material, wherein the first particle has a part of the layered material covered with the metal material and the rest of the layered material is exposed, and wherein the plurality of particles include a second particle in which the entire layered material is covered with the metal material and a third particle in which the entire layered material is exposed.

9. The conductive material according to claim 8, wherein the metal material has a higher conductivity than that of the layered material.

10. The conductive material according to claim 8, wherein M is at least one selected from the group consisting of Ti, Zr, Hf, V, Nb, Ta, Cr, and Mo.

11. The conductive material according to claim 8, wherein a proportion of the metal material in the plurality of particles is 1% to 30% by mass.

12. A conductive film comprising:
a film body comprising the conductive material according to claim 8.

13. An electrochemical capacitor comprising:
an electrolytic solution; and
two electrodes spaced apart from each other in the electrolytic solution, wherein at least one of the two electrodes comprises the conductive film according to claim 12.

14. An electrochemical capacitor comprising:
an electrolytic solution; and
two electrodes spaced apart from each other in the electrolytic solution, wherein at least one of the two electrodes comprises the conductive material according to claim 8.

15. A method for producing a conductive material, the method comprising:
(a) covering one or more particles of a layered material having one or plural layers with a metal material to obtain one or more precursor particles,
the one or plural layers including a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T existing on a surface of the layer body, wherein T is at least one selected from the group consisting of a hydroxyl group, a fluorine atom, a chlorine atom, an oxygen atom, and a hydrogen atom; and (b) pulverizing the one or more precursor particles to obtain a plurality of particles containing at least a first particle with the metal material at least partially covering the layered material, wherein the first particle has a part of the layered material covered with the metal material and the rest of the layered material is exposed, and wherein in the first particle, one of two opposing planes of the layered material is covered with the metal material, and the other is exposed.

16. The method for producing a conductive material according to claim 15, wherein the metal material has a higher conductivity than that of the layered material.

17. The method for producing a conductive material according to claim 15, wherein M is at least one selected from the group consisting of Ti, Zr, Hf, V, Nb, Ta, Cr, and Mo.

18. The method for producing a conductive material according to claim 15, wherein a proportion of the metal material in the plurality of particles is 11 to 30, by mass.

19. A method for producing a conductive film, the method comprising:
forming the plurality of particles obtained by the method for producing a conductive material according to claim 15 into a film form.

20. A method for producing a conductive material, the method comprising:
(a) covering one or more particles of a layered material having one or plural layers with a metal material to obtain one or more precursor particles,
the one or plural layers including a layer body represented by:

wherein M is at least one metal of Group 3, 4, 5, 6, or 7, X is a carbon atom, a nitrogen atom, or a combination thereof, n is not less than 1 and not more than 4, and m is more than n but not more than 5, and
a modifier or terminal T existing on a surface of the layer body, wherein T is at least one selected from the group consisting of a hydroxyl group, a fluorine atom, a chlorine atom, an oxygen atom, and a hydrogen atom; and (b) pulverizing the one or more precursor particles to obtain a plurality of particles containing at least a first particle with the metal material at least partially covering the layered material,
wherein the first particle has a part of the layered material covered with the metal material and the rest of the layered material is exposed, and
wherein the plurality of particles contain a second particle in which the entire layered material is covered with the metal material.

21. The method for producing a conductive material according to claim 20, wherein the metal material has a higher conductivity than that of the layered material.

22. The method for producing a conductive material according to claim 20, wherein M is at least one selected from the group consisting of Ti, Zr, Hf, V, Nb, Ta, Cr, and Mo.

23. The method for producing a conductive material according to claim 20, wherein a proportion of the metal material in the plurality of particles is 11 to 30, by mass.

24. A method for producing a conductive film, the method comprising:
forming the plurality of particles obtained by the method for producing a conductive material according to claim 20 into a film form.

* * * * *